(12) United States Patent
Petrovic et al.

(10) Patent No.: US 10,124,965 B2
(45) Date of Patent: Nov. 13, 2018

(54) DECONSOLIDATION-TYPE CONVEYOR DEVICE AND CORRESPONDING METHOD

(71) Applicant: GEBO PACKAGING SOLUTIONS FRANCE, Reichstett (FR)

(72) Inventors: Zmaj Petrovic, Reichstett (FR); Anthony Gehin, Reichstett (FR)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 0 days.

(21) Appl. No.: 15/317,334

(22) PCT Filed: Jun. 4, 2015

(86) PCT No.: PCT/FR2015/051480
§ 371 (c)(1),
(2) Date: Dec. 8, 2016

(87) PCT Pub. No.: WO2015/189501
PCT Pub. Date: Dec. 17, 2015

(65) Prior Publication Data
US 2017/0121125 A1    May 4, 2017

(30) Foreign Application Priority Data
Jun. 11, 2014   (FR) ...................... 14 55275

(51) Int. Cl.
*B65G 47/71* (2006.01)
*B65G 47/31* (2006.01)
(52) U.S. Cl.
CPC ........... *B65G 47/715* (2013.01); *B65G 47/31* (2013.01); *B65G 2201/0244* (2013.01)

(58) Field of Classification Search
CPC .......... B65G 47/715; B65G 2201/0244; B65G 47/31; B65G 47/261; B65G 15/10; B65G 15/12; B65G 15/20
(Continued)

(56) References Cited

U.S. PATENT DOCUMENTS 3,109,529 A   11/1963  Carter
4,308,944 A    1/1982  Probst
(Continued)

FOREIGN PATENT DOCUMENTS

DE    26 27 277 A1    12/1977
DE    35 05 253 A1     8/1986
(Continued)

OTHER PUBLICATIONS

Description FR2531046 (Year: 2017).*
International Search Report, dated Aug. 26, 2015, from corresponding PCT Application.

*Primary Examiner* — Mark A Deuble
(74) *Attorney, Agent, or Firm* — Young & Thompson

(57) ABSTRACT

A device (1) for conveying products, has a first conveying portion (2), referred to as a quick portion (2), and a second conveying portion (3), referred to as a slow portion (3), in which the products then circulate in a linear fashion in a longitudinal conveying direction (4), normally slower than in the quick portion (2). The products circulate from the quick portion (2) towards the slow portion (3), in which they are then organized into a flow that is wider than in the quick portion (2), the quick portion (2) and the slow portion (3) being placed next to one another. Upstream from the slow portion (3), the quick portion (2) has an upstream guide (5) which is directed angularly towards the slow portion (3). A method for implementing the device is also described.

19 Claims, 3 Drawing Sheets

(58) Field of Classification Search
USPC .................. 198/445, 461.1, 462.1, 462.3
See application file for complete search history.

(56) References Cited

U.S. PATENT DOCUMENTS

| | | | |
|---|---|---|---|
| 4,496,040 A | 1/1985 | Kronseder et al. | |
| 4,874,079 A | 10/1989 | Frenkel et al. | |
| 4,880,103 A | 11/1989 | Ludwig et al. | |
| 6,206,174 B1* | 3/2001 | Koltz .................. | B65G 47/715 |
| | | | 198/444 |
| 8,196,733 B2* | 6/2012 | Hahn .................... | B65G 47/71 |
| | | | 198/347.4 |

FOREIGN PATENT DOCUMENTS

| | | |
|---|---|---|
| DE | 42 13 557 A1 | 10/1993 |
| DE | 195 30 626 A1 | 2/1997 |
| EP | 0 364 894 A1 | 4/1990 |
| FR | 2 531 046 A1 | 2/1984 |
| FR | 2 604 693 A1 | 4/1988 |

* cited by examiner

DECONSOLIDATION-TYPE CONVEYOR DEVICE AND CORRESPONDING METHOD

BACKGROUND OF THE INVENTION

Field of the Invention

This invention pertains to the field of equipment for conveying and has as its object a particular conveying device, as well as a method for using such a device.

The movement of products, in a conveying and handling line, can, depending on the needs, take place either in a single line, the products being then aligned one behind the other in a single column or line, or in bulk, the products then being able also to be next to one another, according to a more or less structured arrangement. A single-line movement is, for example, necessary as long as the products must be handled by unit, for labeling or counting, for example. A movement in bulk is selected in particular to ensure accumulation functions, to reduce the length of the equipment, or even to reduce the travel speed of the products while preserving an overall flow rate.

Equipment is then necessary to ensure the transitions between these two conveying forms: an aligner thus has the function of making the products go from a bulk configuration to a single-line configuration, and therefore of reducing the number of columns of products, and a deconsolidator has the reverse function, namely that of increasing the number of columns, in particular to make the products go from a single-line configuration to a bulk configuration. The invention relates more particularly to the deconsolidators.

Description of the Related Art

Generally, a deconsolidator has, on the one hand, a speed differential between two conveying portions, namely a fast conveying portion and a slower conveying portion, thus causing the products to be positioned side-by-side to preserve the overall flow rate, and, on the other hand, means for making the products go from the fast portion to the slow portion. FR2531046 thus discloses the use of an inclined plane to transfer the products from the fast portion to the slow portion. A robust operation, however, is very difficult to attain at high speeds by using gravity. Mechanical guides are preferred today to ensure the passing from one portion to the next.

Thus, embodiments are known that are in the form of a deconsolidator arranged in an angular zone of a conveyor. The products travel in a single line in the fast portion, and the passing of the products from the fast portion to the slow portion takes place in the curve of the conveyor, where the fast portion is formed by the zone with a small radius of curvature, and the slow portion is formed by a series of lines in the zone of the higher radii of curvature. This embodiment has numerous drawbacks. Actually, it can more easily lead to falls of products during the passing from one conveyor to the next, because of the greater separation between curved conveyors, resulting in particular from higher wear. Furthermore, because of the curved shape, the driving direction in the slow portion is not uniform, which destabilizes the products more, in particular at high speed. Finally, in such a configuration, an effective deconsolidation can be achieved only if the angle between the two directions of speed is significant. At high speed, the falls are then very frequent.

From FR2604693, a solution is also known for multistage deconsolidation on parallel conveyors, in which the products arrive in a single line, then travel gradually transversely in a first conveyor having a sequence of two zones with a speed differential, then arrive on a second output conveyor, at a still lower speed. In the first conveyor, the products are both slowed and moved transversely, which, at high speed, easily causes falls. Furthermore, to redirect the products transversely at the same time as they are slowed necessitates the use of guides. Under the effect of the braking, the slowed products thus accumulate gradually against these guides and the pressure in this column can reach values such that the column breaks up and a product is then violently ejected transversely. It is therefore not possible, with this type of embodiment, to attain high speeds and to deconsolidate over a short conveying distance, necessitating significant speed gradients.

U.S. Pat. No. 4,308,944 also has a multistage deconsolidation, in which the products travel on parallel conveyors that have a speed gradient, while going each time from a fast conveyor to a slow conveyor thanks to an angled guide, along which the products accumulate until creating the problem already mentioned above of the breaking up of the column of products. A multistage slowing of the products leads to excessive lengths for the entire device. Moreover, this embodiment illustrates a particularly problematic phenomenon at high speed: the end portion of the guide must be extended transversely to the direction of advance to cause the products to go as quickly as possible to the slow portion, but at high speed, the more transverse this end portion is, the more the products run the risk of being thrown against the opposite guide and falling. Furthermore, a violent transverse deflection increases the pressure within the column of products upstream, destabilizes the products more, and intensifies the harmful centrifugal phenomena once the product is freed from the guide.

Finally, other deconsolidator-type embodiments are also known, essentially in the form of two linear conveying zones that are parallel and side-by-side, having a speed differential relative to one another, the fastest portion having at its terminating end a guide ensuring a transverse deflection of the products toward the slowest portion. This type of embodiment, however, itself also leads to producing simultaneously the reduction in speed and the transverse movement, which destabilizes the products too much at high speed. The pressure along the end guide can also become problematic, as described above.

BRIEF SUMMARY OF THE INVENTION

The invention thus has as its object to improve the state of the art from the way described above, and aims in particular to attaining a deconsolidation over the shortest length possible, limiting risks of falling of the products and reliable at high speed, or about 80,000 products per hour or more.

For this purpose, the invention proposes deconsolidating the products in the area of a linear conveyor, having preferably one speed gradient, up to which the products are brought with an essentially uniform speed and in a direction steadily oriented toward said conveyor.

The invention thus has as its object a device for conveying products, having a first conveying portion, referred to as the fast portion, and a second conveying portion, referred to as the slow portion, where the products then travel linearly in a longitudinal conveying direction and normally more slowly than in the fast portion, said products traveling from the fast portion to the slow portion in the area of which they are organized and then into a flow that has a greater width than within the fast portion, the fast portion and the slow portion being placed beside one another.

This device is characterized in that upstream from the slow portion, the fast portion has an upstream guide that is oriented angularly in the direction of the slow portion.

The invention also has as its object a method for using such a device, namely a method of conveying in which the products travel on a first conveying portion, referred to as the fast portion, and then on a second conveying portion, referred to as the slow portion, the travel in the slow portion taking place linearly in a conveying direction, the travel in the fast portion, before the products arrive on the slow portion, taking place in the form of a flow that is less wide and faster than in the slow portion.

This method is characterized in that the travel in the fast portion takes place in a principal direction that is different from the conveying direction and that is gradually oriented toward the slow portion.

BRIEF DESCRIPTION OF THE DRAWINGS

The invention will be better understood thanks to the description below that is based on possible embodiments, explained in a way that is illustrative and in no way limiting, with reference to the following accompanying figures.

DETAILED DESCRIPTION OF THE PREFERRED EMBODIMENTS

Figure 1:
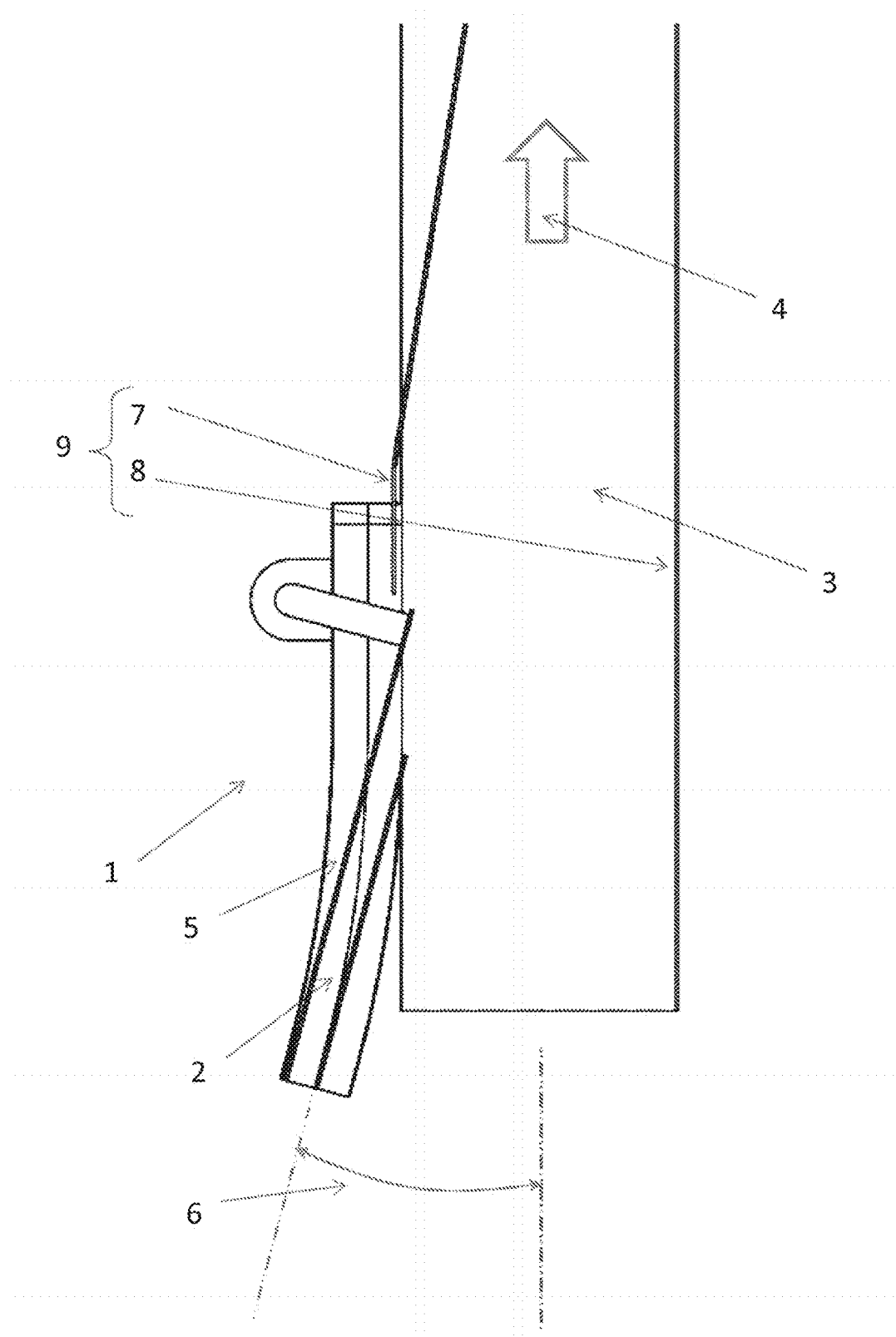
FIG. 1 presents a device according to the invention, in which the conveyors have not, however, been shown, but only their specific guides.
Figure 2:
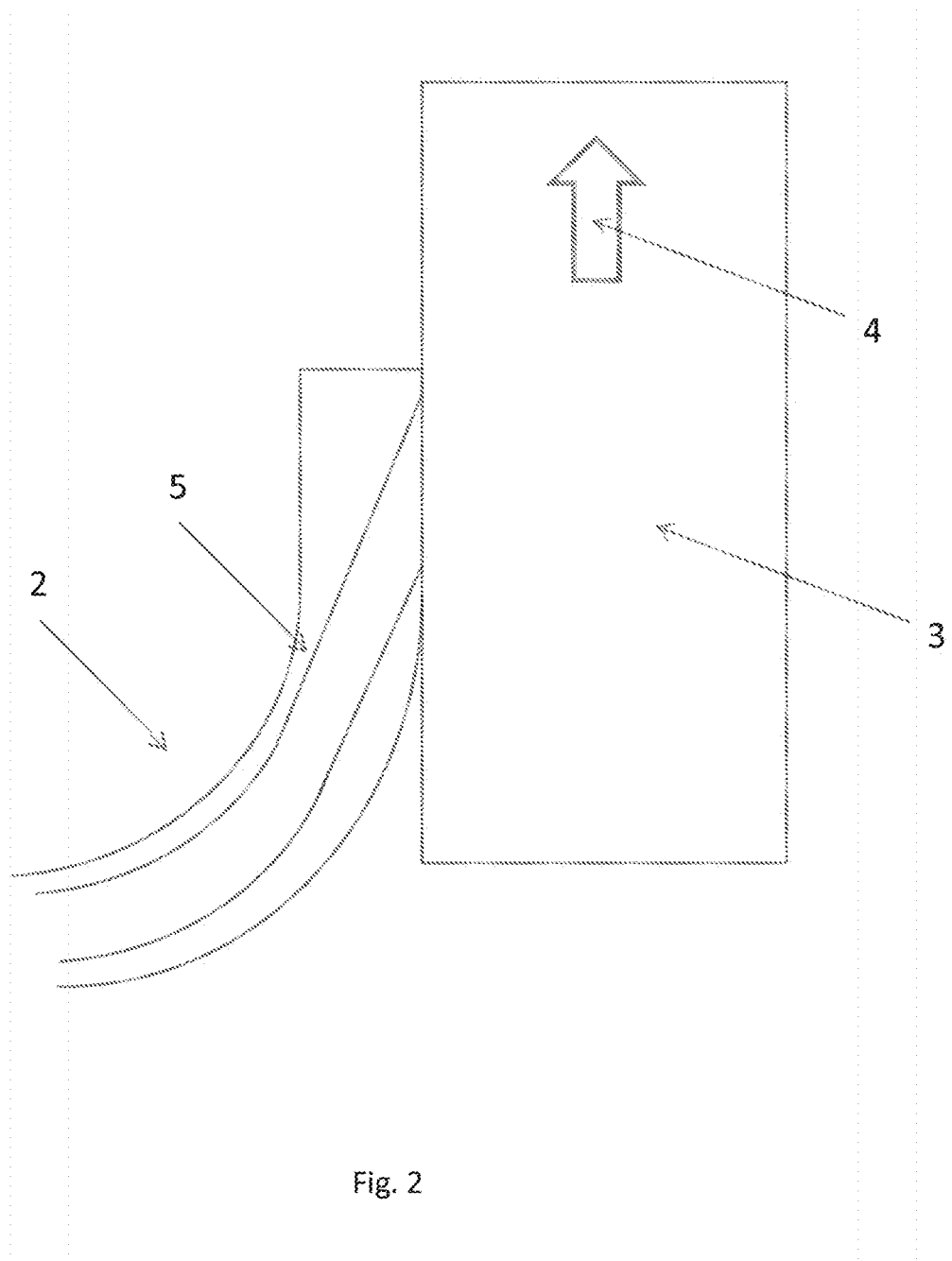
FIG. 2 shows in diagram form an embodiment where, upstream from the slow portion, the guide is linear and the conveying curved.

The invention thus has as its object a device 1 for conveying products, having a first conveying portion 2, referred to as the fast portion 2, and a second conveying portion 3, referred to as the slow portion 3, where the products then travel linearly in a conveying direction 4 that is longitudinal and normally slower than in the fast portion 2, said products traveling from the fast portion 2 to the slow portion 3 in the area of which they are then organized into a flow that has a greater width than within the fast portion 2, the fast portion 2 and the slow portion 3 being placed beside one another.

The conveying device 1 therefore has conveying means, belt-type, chain-type or the like, to convey the products 11 both in the fast portion 2 and in the slow portion 3. In the latter, the conveying means therefore extend linearly in a conveying direction 4, and are intended, in normal operation, to cause the products 11 to travel less quickly than in the fast portion 2. The conveyors of these two portions therefore do not have the same speed, and independent control means can be provided for them. As the travel speed of the products decreases while going from the fast portion 2 to the slow portion 3, the size of the flow of products increases transversely in a corresponding manner. The products can thus go from a single-line configuration in the fast portion 2 to a bulk configuration in the slow portion 3. Generally, the width of the flow of product is increased at the time of the passing from the slow portion 3 to the fast portion 2.

The conveyors of the fast portion 2 therefore travel more quickly than the conveyors of the slow portion 3. The speed of the conveyors can, of course, not be uniform in the same portion. Thus, the fast portion 2 optionally has a decreasing speed gradient while approaching the slow portion 3, the latter for its part optionally having a decreasing speed gradient while separating from the fast portion 2.

According to the invention, upstream from the slow portion 3, the fast portion 2 has an upstream guide 5 that is oriented angularly in the direction of the slow portion 3, so as to direct laterally and gradually the products toward the slow portion 3. This therefore leads to bringing the products gradually closer toward the median axis of the conveying means of the slow portion 3. In the prior art, it is generally when the products 11 arrive in contact with the slow portion 3 that they are brought transversely from the fast portion 2 to the slow portion 3, with a more or less large angle. The invention therefore proposes anticipating this deflection in the direction of the slow portion and initiating it while the product 11 is still exclusively on the fast portion 2. The direction of the speed of the product 11 is therefore not changed during the passage onto the slow portion 3.

The upstream guide 5 in particular takes the form of a pair of guide walls, one on each side of the group of products 11 traveling in the fast portion 2. Generally, the upstream guide 5 is thus, upstream from the slow portion 3, separated from the latter by a distance that gradually decreases in the direction of the flow of products, thanks to which the products are gradually brought laterally toward the slow portion 3 even though they are still entirely on the fast portion 2.

According to a possible additional characteristic, the upstream guide 5 directs the products essentially linearly toward the slow portion 3. The products 11 therefore undergo, in the area of the fast portion 2, indeed also at the beginning of their progress on the slow portion 3, an orderly linear movement oriented angularly in the direction of the slow portion 3 and therefore of its median axis, and this with a relatively small angle, as will be explained again further on. The guiding of the product therefore basically does not change direction, which avoids destabilizing the products.

According to another possible additional characteristic, before the slow portion 3, the upstream guide 5, on the one hand, and the conveying means of the fast portion 2, on the other hand, have approximately the same direction of action on the products, and this over at least one part or even the entirety of the fast portion 2, so as to avoid a sliding of the products on said conveying means that would prevent controlling in a satisfactory way the movement of the products up to the slow portion 3. Actually, if the guiding direction and the conveying direction are not the same, the products 11 slide on the conveying means, the latter then being able to apply only a slight drive force from the base of the products. Now, it is necessary to apply enough force on the products given the slowing that they are undergoing from their base as soon as they arrive on the slow portion 3. If the upstream conveying means are unable to exert enough force on the products, they are going to accumulate until reaching a conveying portion still upstream that will put the entire column in motion. It is therefore proposed here to install, in the area of the fast portion 2 and thus near the slow portion 3, an upstream guide 5 and a conveying that impose the same movement on the product, so as to be able to drive the products once near the slow portion 3. The dimensions of the conveying device 1 can thus be reduced.

The common profile of the upstream guide 5 and of the corresponding conveying can have different shapes. Thus, the conveying and the upstream guide 5 are, for example, both linear, or else curved along a curved profile, whose center of curvature is on one side or the other in relation to the interface between the fast portion 2 and the slow portion 3.

Of course, it remains possible to provide a consequent angle between, on the one hand, the upstream guide 5 and, on the other hand, the conveying of the fast portion 2. For example, the upstream guide 5 can extend obliquely on a conveyor, optionally made of several lines, which can thus simplify the construction, the conveyor being, for example, parallel to the conveying direction 4.

In particular embodiments, the upstream guide 5 stops in the area of the beginning of the slow portion 3. A short extension of the upstream guide 5 on top of the slow portion 3, i.e., beyond the interface between the fast portion 2 and the slow portion 3, is conceivable so that the products, once they empty into the slow portion 3 and are disengaged from the upstream guide 5, are free optionally to move back by a transverse pullback movement in the direction of the closest guide wall of the slow portion 3. Problems can appear if the upstream guide 5 extends excessively on top of the slow portion 3. Actually, the guide on top of the slow portion 3 must preferably be short enough to prevent a column of products from being able to be formed against it so as to avoid an accumulation of products and an increase of the pressure that can result in a breaking up of this column of products and therefore falls.

According to another possible additional characteristic, the upstream guide 5 performs a lateral deflection of the products in a principal direction that has, in relation to the conveying direction 4, a small angle 6, so as to prevent too violent a transverse movement having the harmful effect of destabilizing the products 11 and increasing the pressure in the fast portion 2, in particular an angle 6 of between 5 and 30 degrees, preferably between 10 and 20 degrees. The transverse deflection therefore represents a movement that, in relation to the conveying direction 4, has a transverse component but also a longitudinal component, the balance between the two components ensuring an entry of the products on the slow portion 3 that is almost parallel to the conveying direction 4 or in any case only slightly offset angularly.

For the purpose of improving the deconsolidation and of facilitating the transverse expanding of the flow of products over a short conveying distance, and according to another possible additional characteristic of the conveying device 1, it comprises, further, a means for dynamic deformation of the end of the upstream guide 5 that is the farthest downstream in the direction of the flow. Said end is thus driven by a transverse movement in the conveying direction 4, so that the orientation of the movement that the upstream guide 5 gives to the products 11 when they empty onto the slow portion 3 varies slightly over time. The transverse movement is preferably alternating and of small amplitude, applied near the free end of the wall. The latter is fixed in relation to the frame at a distance from the free end. It is thus possible to send the products that are separated from one another in the longitudinal direction on the slow portion 3, which limits the risk of collisions and falls.

Said end of the upstream guide 5 thus moves between two end positions, around a median position. In this median position, the end is aligned in the extension of the remainder of the upstream guide 5, i.e., it preferably has only a small angle in relation to the conveying direction 4.

According to another possible additional characteristic of the conveying device 1, it has a downstream guide 9 extending into the area of the slow portion 3 and comprising a first guide wall, referred to as a proximal wall 7, on the side of the fast portion 2, as well as a second guide wall, on the opposite side, referred to as a distal wall 8, the proximal wall 7 beginning, in a transverse direction, in transverse set back in relation to the terminal end of the upstream guide 5. This transverse set back, perpendicular to the conveying direction 4, frees an additional space so that the products can move back without colliding once they leave the upstream guide 5.

The invention also has as its object a method using the device as described above in its different variants, namely a method of conveying in which the products travel on a first conveying portion 2, referred to as the fast portion 2, and then on a second conveying portion 3, referred to as the slow portion 3, the travel in the slow portion 3 taking place linearly in a conveying direction 4, the travel in the fast portion 2, before the products arrive on the slow portion 3, taking place in the form of a flow that is less wide and faster than in the slow portion 3, so as to perform a deconsolidating of the products between the fast portion 2 and the slow portion 3.

Under the effect of the travel speed of the conveyors, the products therefore travel faster on the fast portion 2 than on the slow portion 3, where they are gradually slowed because of the lower speed of the conveyors in this place. The method therefore makes it possible to perform a deconsolidation stage by causing the products to pass toward a zone where the driving by the conveyors is slower, and this thanks to mechanical guide means that laterally contain the flow of products.

According to the invention, the travel in the fast portion 2 takes place in a principal direction that is different from the conveying direction 4 and gradually oriented toward the slow portion 3, so that, before even being on the slow portion 3, the product is guided laterally toward it. Before arriving on the slow portion 3, there is therefore given to the product, which is then on the side, a speed oriented in the direction of said slow portion 3, and more particularly toward the edge of the slow portion 3 that is opposite to the fast portion 2. This movement is given to it before the product even approaches the fast portion 2. This movement preferably has an angular offsetting 6 that is small in relation to the conveying direction 4, so that the essential effect of the conveyors of the slow portion 3 is to slow the products and not to change the direction of their movement, which would have a tendency to destabilize them and cause them to fall, in particular at high speed.

Thus, according to a possible additional characteristic of the method, the angle 6 between, on the one hand, the conveying direction 4, and, on the other hand, the principal direction of the movement in the fast portion 2 when the products empty onto the slow portion 3, is small, so as to prevent sudden transverse movements of the products while they undergo the sliding on the conveyors of the slow portion 3, for example an angle 6 of between 5 and 30 degrees, preferably about 15 degrees.

Finally, according to another possible characteristic of the method, the conveying on the fast portion 2, before the products arrive on the slow portion 3, takes place without sliding between, on the one hand, the products and, on the other hand, the conveying means, and this over all or part of said fast portion 2, so as to avoid an excessive accumulation of the upstream products but also so as to control the behavior of the products emptying onto the slow portion 3.

In the particular embodiment illustrated in the accompanying figures, the conveying device 1 has the function of deconsolidating the flow, namely to transform the configuration of a flow while causing it to go, on the one hand, from a configuration where the products are in a single line behind one another in the area of the fast portion 2, to, on the other hand, a configuration where the products are arranged in bulk, i.e., in a flow having a total width that is greater than a single column of products in the area of the slow portion 3.

The travel speeds change between, on the one hand, the fast portion 2, and, on the other hand, the slow portion 3. As their names reflect, the conveyors travel more slowly in the slow portion 3 than in the fast portion 2, the overall flow rate of products 11 being, of course, maintained. Generally, a decreasing speed gradient for the conveyors can be provided in the fast portion 2, to the extent that the slow portion 3 is being approached, for example to bring the products close to one another, and/or a decreasing speed gradient for the conveyors can be provided in the slow portion 3 to the extent that it is separated from the fast portion 2. The products travel essentially without sliding on the conveyors of the fast portion 2, although a lateral sliding can be organized if the guide and the conveyors are not strictly parallel. Once they have entirely left the fast portion 2, they are entirely on conveyors that travel more slowly. On leaving the fast portion 2 and considering their inertia, the products then generally continue their movement in the direction that it had, so that they slide on the conveyors of the slow portion 3. The friction between the conveyors of the slow portion 3 and the base of the products has the effect of gradually slowing the latter and changes their trajectory.

The slow portion 3 comprises parallel and linear conveyors, which have a tendency to carry the products in a conveying direction 4 that goes from bottom to top in FIG. 1. The fast portion 2 and the slow portion 3 are side by side, i.e., against one another in a direction that is perpendicular to the conveying direction 4, so that a deflection that is transverse to the conveying direction 4 is enough to cause the products to go from the fast portion 2 to the slow portion 3. Preferably, this deflection is smooth and steady.

Since the fast portion 2 of the device 1 is beside the slow portion 3, it is necessary, to have the products go from the fast portion 2 to the slow portion 3, to impose on the products a transfer movement that has a component that is transverse to the linear conveying direction 4 on the slow portion 3. This movement in the direction of the slow portion 3 is caused by the upstream guide 5. In the fast portion 2, the products are moved and guided under the combined effect of the conveyor or conveyors in this portion as well as the upstream guide 5.

Figure 3:
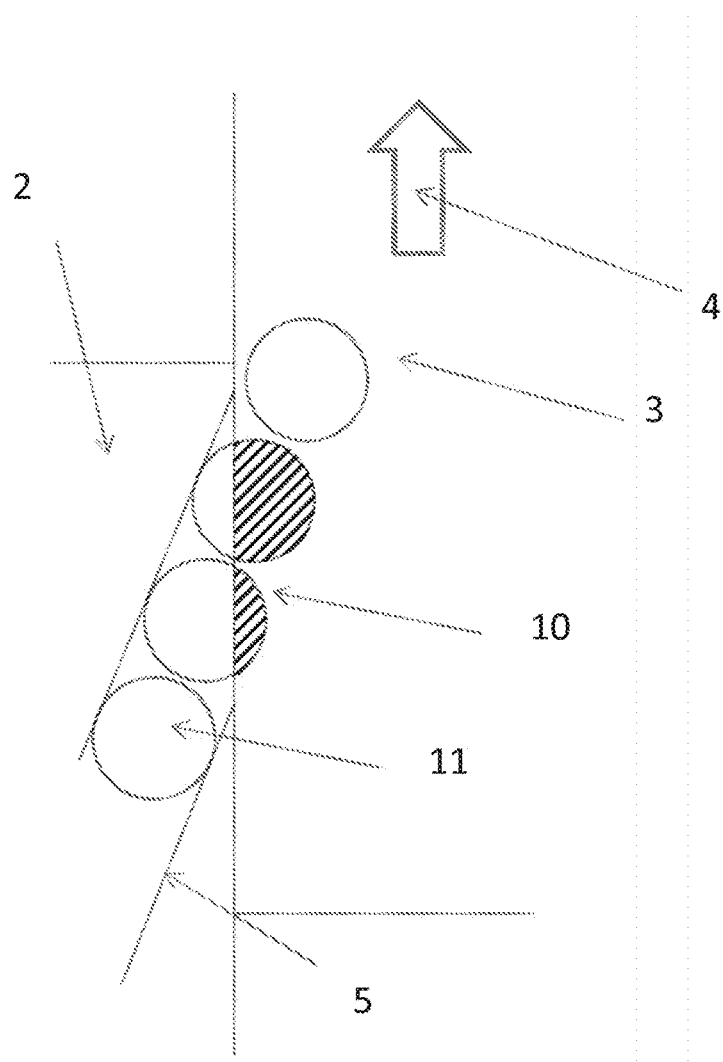
FIG. 3 illustrates the combined portion, where the products are simultaneously on the fast portion and on the slow portion.

Since the products go gradually from the fast portion 2 to the slow portion 3, the conveying device 1 also has a combined portion 10 where the products are overlapping both on the slow portion 3 and the fast portion 2, i.e., a part of their base is in contact with the conveyors of the slow portion 3 and the rest of their base is in contact with the conveyors of the fast portion 2. During the transverse deflection, or transfer movement, the product travels on the combined portion 10, the part of its base in contact with the slow portion 3 thus decreasing gradually in favor of the part of its base in contact with the fast portion 2 as FIG. 3 shows.

In the particular case illustrated, the products 11 that travel in the fast portion 2 move in a single line, and the separation from the upstream guide walls 5 is therefore adapted to the dimension of a single product. Consequently, the combined portion 10 begins at the section of the upstream guide 5 from which the latter, or its virtual extension, commences to be extended on top of the slow portion 3. From this mouth of the upstream guide 5, the products begin to travel on the slow portion 3, and it is possible no longer to guide the products from the upstream side of the flow. In the combined portion 10, the guide on the downstream side of the flow is again ensured, to the extent that it still essentially extends only on top of the fast portion 2, as FIGS. 1 and 3 show. Preferably, the guide in the area of the combined portion 8 is a linear extension without changing of direction, so as to limit the effects of inertia there. Furthermore, a too sudden change of direction in the upstream guide 5 also has the effect of increasing the pressure in the line of products, which creates problems of instability once the products are freed from the guide.

In the prior art, the transverse movement of the products, i.e., their movement in the direction of the slow portion 3 and comprising a transverse component, is often provided only in the combined portion 10. In the invention, the movement in the direction of the slow portion 3 takes place already when the product is exclusively on the fast portion 2, i.e., the base of the products is in contact only with the conveyor or conveyors of the fast portion 2. The upstream guide 5, which in particular has the function of ensuring this movement in the direction of the slow portion 3, guides the products toward the latter while their entire base is still in contact with the conveyors of the fast portion 2.

Thus, the conveying device 1 is provided with an upstream guide 5 that acts on the products, on approaching the slow portion 3 but while the products are still entirely on the fast portion 2, so as to guide them toward the slow portion 3, i.e., so as to impose on them a movement that has a component that is transverse to the linear conveying direction 4 of the slow portion 3. Preferably, this movement in the direction of the slow portion 3, in front of and to the right of the combined portion 10, is gradual or steady, for the purpose of avoiding changes in direction that are too sudden for the products. Actually, changes in direction that are too sudden have the effect of destabilizing the products when they are traveling at high speed.

In the particular embodiment illustrated in FIG. 1, the upstream guide 5 is essentially linear, in the area of the combined portion 10 and even before, which has the advantageous effect of imposing on the products a movement whose direction is stable, which avoids destabilizing the products under the effect of their inertia at high speed. In this same figure, it is seen that the conveyors of the fast portion 2 have a curvature, while the upstream guide 5 that extends on top of them is linear. Generally, on approaching the combined portion 10, the upstream guide 5 is such that the products are already directed toward the slow portion 3. Furthermore, in the combined portion 10, the guiding takes place in the extension of the one provided upstream, so as to avoid imposing simultaneously on the products, on the one hand, a change in direction of the movement, and, on the other hand, a slowing caused by the difference in speed between the fast portion 2 and the slow portion 3 on which they begin to travel when they arrive on the slow portion 3.

Moreover, as the accompanying figures show, the upstream guide 5 preferably does not extend on top of the slow portion 3, and this in particular for the part of the upstream guide 5 that is found downstream in the direction of the flow of products. Actually, when the products arrive on the slow portion 3, they undergo a braking caused by the slower speed of the conveyors of the slow portion 3. If the guide is extended in the area of the slow portion 3, the products then run the risk of being flattened against its most downstream edge in the direction of the flow, particularly taking into account their inertia and the pushing of the column of products. The products then accumulate behind one another along this edge. This column of products in contact is then subjected to the pressure of the products that are still in the fast portion 2, to the friction at their base, as well as to the resistance of the guide. In the cases of products having a circular base in particular, this state of forces can lead to causing the column to break up, at least one product then being violently thrown far from the edge, which obviously leads to falls following collisions with other products or with another guide. It is therefore preferable to prevent the upstream guide 5 from extending on top of the slow portion 3, which makes it possible for the products to arrive on the latter free from being repositioned. By remaining essentially in the area of the fast portion 2, the upstream guide 5 thus does not make it possible to form a column of several products in the slow portion 3. FIG. 1 shows, for example, that the upstream guide 5 extends very slightly on top of the slow portion 3, yet without hindering the progression.

It should be noted that the upstream guide 5 is such that the products arrive on the slow portion 3 with a movement having a small angle relative to the conveying direction 4. This angle 6 actually corresponds to the one that separates, on the one hand, the direction of the speed that the product has a tendency to maintain once it has left the fast portion 2 to continue on the slow portion 3, and, on the other hand, the conveying direction 4 in the area of the slow portion 3. The upstream guide 5, in the part that ends up on the combined portion 10, even also in said combined portion 10, thus has a small angle 6 relative to the conveying direction 4, particularly from 5 to 30 degrees, preferably from 10 to 20. In the version of FIG. 1, where the upstream guide 5 is linear for its part in front of the combined portion 10 as well as for its part to the right of the combined portion 10, the angle corresponds directly to the one between the two linear directions. In a case where the upstream guide 5 is curved, it is essentially the principal direction that has the upstream guide 5 near the combined portion 10 that is taken into account to determine the angle, i.e., the angle of the upstream guide 5 just in front of the combined portion 10, even also in the area of the combined portion 10.

By arriving thus on the slow portion 3 with a movement that is only slightly transverse to the conveying direction 4, the products 11, under the effect of their inertia, can travel a longitudinal path that is higher once they have arrived on the slow portion 3, which limits the risk that the following products run into the preceding ones. Furthermore, such an orientation also makes it possible to convey the products at higher speed in the fast portion 2 and to have a higher overall flow rate, since at the exit, they have less of a tendency to be directed toward the guide opposite. With such an orientation of movement relative to the conveying direction 4, the braking caused by the slower conveyors of the slow portion 3 has less of an effect on the direction of the movement of the products and therefore destabilizes them less, and more of an effect on the value of their speed. With a small angle between, on the one hand, the direction of the movement of the products at the entry of the slow portion 3, and, on the other hand, the conveying direction 4, the risk is therefore reduced that the speed differential of the conveyors between the fast portion 2 and the slow portion 3 destabilizes the products and causes them to fall. It is therefore possible to further increase the speed differential, and thus to deconsolidate over a shorter distance. The device 1 can then be shorter than another that performs the same transverse expansion of the flow of products.

To further speed up the deconsolidation, and therefore to reduce more the length of the device 1, the latter can be provided with a means for dynamic deformation of the upstream guide 5, which will have the effect of causing the direction of the movement to vary slightly when the products empty onto the slow portion 3. The free end of the wall that is downstream from the flow of products is thus connected to a movable piece of equipment rather than attached to the frame. By driving this movable piece of equipment with an alternating movement, it is the final direction of the movement of the products in the fast portion 2 that is changed. The angular amplitude then corresponds to a deflection of the free end that is less than 2 centimeters, preferably less than 1 centimeter.

Varying slightly the direction of the speed exiting the fast portion 2 makes it possible in effect to separate from one another two products that are aligned in the conveying direction 4 on the slow portion 3, and thus to reduce the risk of falls. Nevertheless, a considerable amplitude of the movement of the free end of the upstream guide 5 has the effect of imposing changes in direction that are too significant for the products while they are traveling toward the slow portion 3, which destabilizes them excessively since the travel speeds are high.

Advantageously, by sending the products on the slow portion 3 with a speed that is only slightly transverse to the conveying direction 4, the deflection of the free end can be small, as quantified above. Actually, since the two directions of movement, namely, on the one hand, on the fast portion 2, and, on the other hand, on the slow portion 3, are almost parallel, even a slight deflection of the free end of the upstream guide 5 makes it possible to obtain a considerable distance between two aligned products on the slow portion 3 that are behind one another in terms of the conveying direction 4. It is therefore possible to obtain enough longitudinal separation between the products 11 on the slow portion 3 without thereby destabilizing the products under the effect of an upstream guide 5 that is moving with an amplitude that is too high.

As FIG. 1 shows, the device 1 is also equipped with a guide in the area of the slow portion 3, in the form of two walls facing each other, extending parallel to the conveying direction 4 and transversely delimiting the zone available for the products. A first wall, or proximal wall 7, extends approximately in the area of the interface between the fast portion 2 and the slow portion 3. The second wall, or distal wall 8, extends opposite the first and is the farthest from the two relative to the fast portion 2. Advantageously, the free end of the proximal wall is in transverse set back relative to the free end of the upstream guide 5, which makes it possible to allow more space for the products to be repositioned while being deconsolidated. Actually, taking into account the presence of the other products, on the slow portion 3, a product freed by the upstream guide 5 can be made to move back while moving transversely in moving away from the distal wall 8. The transverse distance between the end of the upstream guide 5 and the proximal wall makes it possible then for the product 11 to be repositioned while moving away from the distal wall.

Thanks to the invention, it is thus possible to perform a deconsolidation of the products over a reduced distance, without, however, causing falls of products under conditions of operating at high speed.

Although the above description is based on particular embodiments, it is in no way limiting of the scope of the invention, and modifications can be introduced, particularly by substitution of technical equivalents or by a different combination of all or part of the characteristics developed above.

The invention claimed is:

1. A device (1) for conveying products, comprising:
a first faster conveying portion (2);
an upstream guide (5) on the first faster conveying portion (2), the upstream guide (5) having a width that defines a first flow width of the products in a first direction through the upstream guide (5) on the first faster conveying portion(2);
a second slower conveying portion (3),
the first faster portion (2) and the second slower portion (3) being placed beside one another; and
a conveying device (1) of the first faster conveying portion (1) and of the second slower conveying portion (3),
the conveying device conveying the products on the first faster conveying portion (2) in the first direction through the upstream guide (5) and on the second slower conveying portion (3),
the conveying device moving the products on the first faster portion (2) faster than on the second slower portion (3), wherein the products travel in the second slower conveying portion (3) linearly in a longitudinal conveying direction (4) and normally more slowly than in the first faster portion (2),
said products traveling from the first faster portion (2) to the second slower portion (3) in an area of which the products are then organized into a flow that has a greater width than the first flow width of the products through the upstream guide (5) on the first faster portion (2),
wherein the upstream guide (5) directs the products on the first faster portion (2) essentially linearly in the first direction towards the second slower portion (3), and
wherein the upstream guide (5) is oriented angularly on the first faster portion (2) so an angle between the first direction through the upstream guide (5) and the conveying direction of the second slower portion (3) is non-zero.

2. The device for conveying according to claim 1, wherein before the slow portion (3), the upstream guide (5) and the conveying device of the portion (2), have a same principal direction of action on the products over at least a part of the first faster portion (2).

3. The device for conveying according to claim 2, wherein an angle between the principal direction of the upstream guide and the conveying direction in the second slow portion (3), where the products empty onto the second slower portion (3), is between 10 and 20 degrees.

4. The device for conveying according to claim 1, wherein the upstream guide (5) extends to and ends in an area of a beginning of the second slower portion (3).

5. The device for conveying according to claim 1, wherein the upstream guide (5) performs a lateral deflection of the products in a principal direction that has, in relation to the conveying direction (4), an angle (6) between 5 and 30 degrees.

6. The device for conveying according to claim 1, wherein an end of the upstream guide (5) that is farthest downstream in the conveying direction is dynamically deformable by a transverse movement so that a movement of the end of the upstream guide over time varies a direction of the products empting onto the second slower portion.

7. The device for conveying according to claim 1, further comprising a downstream guide (9) extending in an area of the second slower portion (3) and comprising a first guide wall, referred to as a proximal wall (7), on a side of the first faster portion (2), as well as a second guide wall, on an opposite side, referred to as a distal wall (8), the proximal wall (7) beginning, in a transverse direction, in transverse set back in relation to a terminal end of the upstream guide (5).

8. The device for conveying according to claim 1, wherein,
the upstream guide (5) and the conveying device of the first faster portion (2) have a same principal direction that moves the products over the first faster portion (2) in the principal direction prior to changing to the conveying direction in the second slow portion (3).

9. The device for conveying according to claim 1, wherein,
the upstream guide (5) extends obliquely on the first faster portion (2),
the upstream guide (5) is comprised of a pair of linear guide walls that each terminate at an interface of the first faster portion and the second slower portion,
one wall of the pair of linear guide walls being on each side of the first flow width of the products on the first faster conveying portion (2), and
a width between the pair of linear guide walls being the width that defines the first flow width of the products in the first direction through the upstream guide (5) on the first faster conveying portion (2).

10. The device for conveying according to claim 9, wherein an angle between the principal direction of the upstream guide and the conveying direction in the second slow portion (3), at the interface of the first faster portion and the second slower portion where the products empty onto the second slower portion (3), is between 10 and 20 degrees.

11. The device for conveying according to claim 9, wherein an angle between the principal direction of the upstream guide and the conveying direction in the second slow portion (3), at the interface of the first faster portion and the second slower portion where the products empty onto the second slower portion (3), is between 5 and 30 degrees.

12. A method of conveying comprising:
products traveling over a first faster conveying portion (2);
the products traveling on the first faster conveying portion via an upstream guide that directs the products essentially linearly in a principal direction onto a second slower portion; and
then the products traveling over the second slower conveying portion (3),
the products moving on the first faster portion (2) faster than on the second slower portion (3),
the travel of the products over the second slower portion (3) taking place linearly in a conveying direction (4),
the travel of the products in the first faster portion (2) via the upstream guide, before the products arrive on the slow portion (3), taking place in a form of a flow that is less wide and faster than in a width of a flow the second slower portion (3), wherein
the travel of the products in the first faster portion (2) via the upstream guide takes place in the principal direction that is different from the conveying direction (4) and that is gradually oriented toward the second slower portion (3).

13. The method according to claim 12, wherein
an angle (6) between the conveying direction (4), and the principal direction of the movement in the first faster portion (2), when the products empty onto the second slower portion (3), is between 5 and 30 degrees.

14. The method according to claim 12, wherein
the conveying of the products on the first faster portion (2), before the products arrive on the second slower portion (3), takes place without sliding between the products, and the conveying means, and the conveying of the products without sliding on the fast first faster portion (2) taking place over at least part of said first faster portion (2).

15. The method according to claim 12, wherein an angle (6) between the conveying direction (4) in the second slow portion (3), and the principal direction of the movement in the upstream guide over the first faster portion (2), when the products empty onto the second slower portion (3), is between 5 and 30 degrees.

16. The method according to claim 12, wherein an angle (6) between the conveying direction (4) in the second slow portion (3), and the principal direction of the movement in the upstream guide over the first faster portion (2), when the products empty onto the second slower portion (3), is between 10 and 20 degrees.

17. The method according to claim 12, wherein,
the upstream guide (5) extends obliquely on the first faster portion (2),
the upstream guide (5) is comprised of a pair of linear guide walls that each terminate at an interface of the first faster portion and the second slower portion,
one wall of the pair of linear guide walls being on each side of the first flow width of the products on the first faster conveying portion (2),
a width between the pair of linear guide walls being the width that defines the first flow width of the products in the first direction through the upstream guide (5) on the first faster conveying portion(2),
each wall of the pair of guide walls terminating an interface of the first faster portion and the second slower portion.

18. The method according to claim 17, wherein an angle (6) between the conveying direction (4) in the second slow portion (3), and the principal direction of the movement in the upstream guide over the first faster portion (2) , when the products empty onto the second slower portion (3), is between 5 and 30 degrees.

19. The method according to claim 17, wherein an angle (6) between the conveying direction (4) in the second slow portion (3), and the principal direction of the movement in the upstream guide over the first faster portion (2), when the products empty onto the second slower portion (3), is between 10 and 20 degrees.

* * * * *